United States Patent [19]

Harrison, deceased et al.

[11] 4,329,023
[45] May 11, 1982

[54] DIFFUSION FILTER AND METHOD OF MAKING SAME

[76] Inventors: William H. Harrison, deceased, late of Los Angeles, Calif.; by Hartley K. Harrison, executor, 6363 Santa Monica Blvd., Hollywood, Calif. 90038

[21] Appl. No.: 86,250

[22] Filed: Oct. 18, 1979

[51] Int. Cl.³ .......................... G02B 5/02; G02B 13/20
[52] U.S. Cl. .................................................... 350/431
[58] Field of Search ................................ 350/431, 321

[56] References Cited

U.S. PATENT DOCUMENTS

| | | | |
|---|---|---|---|
| 2,240,706 | 5/1941 | Law | 250/488 |
| 2,275,602 | 3/1942 | Beck et al. | 350/431 |
| 2,312,206 | 2/1943 | Calbick | 250/481 X |
| 3,442,569 | 5/1969 | Bonnet | 350/431 |
| 3,833,288 | 9/1974 | Nilsson | 350/431 |

FOREIGN PATENT DOCUMENTS 425002  2/1926  Fed. Rep. of Germany ...... 350/431

*Primary Examiner*—John K. Corbin
*Assistant Examiner*—Scott J. Sugarman
*Attorney, Agent, or Firm*—Fulwider, Patton, Rieber, Lee & Utecht

[57] ABSTRACT

A diffusion filter can be formed by sandblasting a transparent plate to produce a pitted surface. A neutral density cement having an index of refraction different from that of the plate is applied to the pitted surface and a second plate is then bonded to the first by the cement. The opposing surface of the second plate may also be pitted to achieve increased diffusion. Light that strikes the filter and passes directly through without entering the pits forms a sharp image, while light that enters the pits is refracted so that it forms a soft image superimposed on the sharp image. Some light that enters the pits and is scattered within the cement is absorbed.

22 Claims, 2 Drawing Figures

DIFFUSION FILTER AND METHOD OF MAKING SAME

TITLE OF THE INVENTION

The present invention relates to filters for use in combination with an image forming lens, and, more particularly, to diffusion filters.

BACKGROUND OF THE INVENTION

When a photographic representation of a three-dimensional object is formed on a two-dimensional surface, it often takes on an unnatural quality. The image appears overly sharp and details that are not readily apparent when an object is viewed with the naked eye are exaggerated. This effect is particularly noticable and objectionable in portraiture since facial lines and blemishes tend to be too pronounced and sharply defined.

It has been theorized that the unnatural appearance of an overly shape image is attributable to the absence of the stereoscopic that is present when objects are viewed normally. This effect has a tendency to round corners and soften lines of demarkation.

The master painters recognized this problem centuries ago and developed a technique for softening lines to give depth to their work. Photographers have sought, with only limited success, to achieve the same result.

The most common photographic techniques for softening an image, giving it some increased depth and realism, is the use of a diffusion filter. In essence, a diffusion filter is simply a transparent glass or plastic plate that has a roughened surface. It is placed between the photographic subject and the image forming lens. Most of the light reflected by the subject passes through the filter. Some of the light, however, is diffused by irregularities on the surface of the filter and softens the image.

It has been found that conventional diffusion filters have marked disadvantages, primarily halation and veiling. Halation is the tendency of bright areas of the image to be surrounded by a "halo" of diffused light. This effect can be surprisingly pronounced and is highly objectionable if not controlled. For example, a portrait of a person with light hair against a black background will show a lightened area surrounding the hair and extending far into the background. As the amount of diffusion increases, the size and intensity of the halo increases.

"Veiling" refers to the tendency of diffused light to impinge upon all areas of the image format, giving the impression of a whitish veil covering the entire image. Most noticable is the loss of the true black which takes on a distinctly grayish tone. Veiling and haloing are attributable to heterogeneous light, i.e., light that is collected by the lens but is disorganized and is not capable of being focused to form an image.

The principle objective of the invention is to provide an improved diffusion filter that significantly reduces both haloing and veiling.

SUMMARY OF THE INVENTION

A filter in which the invention resides includes a transparent plate with a surface having an array of pits thereon. A light transmissive material is applied to the surface so that it fills the pits. This material has an index of refraction different from the plate and is more absorptive of light when compared to the plate. Light that passes through the filter without striking the pits is collected by the lens to form a first image that is sharply defined. Light that enters the pits is refracted and collected by the lens to form a second image, superimposed on the first, that is softly defined. Some light that enters the pits becomes heterogeneous and is absorbed by the material. It is not collected by the lens.

Preferably, the light transmissive material is a cement which covers a substantial portion of the pitted surface. For color photography, the cement should be of neutral density.

It is also preferred to use a second plate, similar to the first, arranged so that the cement bonds the two plates together, the second plate acting as a cover. For increased diffusion, the second plate may be pitted in a manner similar to the first, the pits of the second plate also being filled by the cement.

The pits should be of irregular configuration and should be randomly arrayed over the pitted surface. The deepest pits should be at least about 0.01 inches in depth.

According to the method of the invention, the pits of the desired irregularity, depth and dispersion can be reliably and repeatedly produced at low cost by sandblasting.

Other features and advantages of the present invention will become apparent from the following detailed description, taken in conjunction with the accompanying drawings, which illustrate, by way of example, the principles of the invention.

DESCRIPTION OF THE PREFERRED EMBODIMENTS

Figure 1:
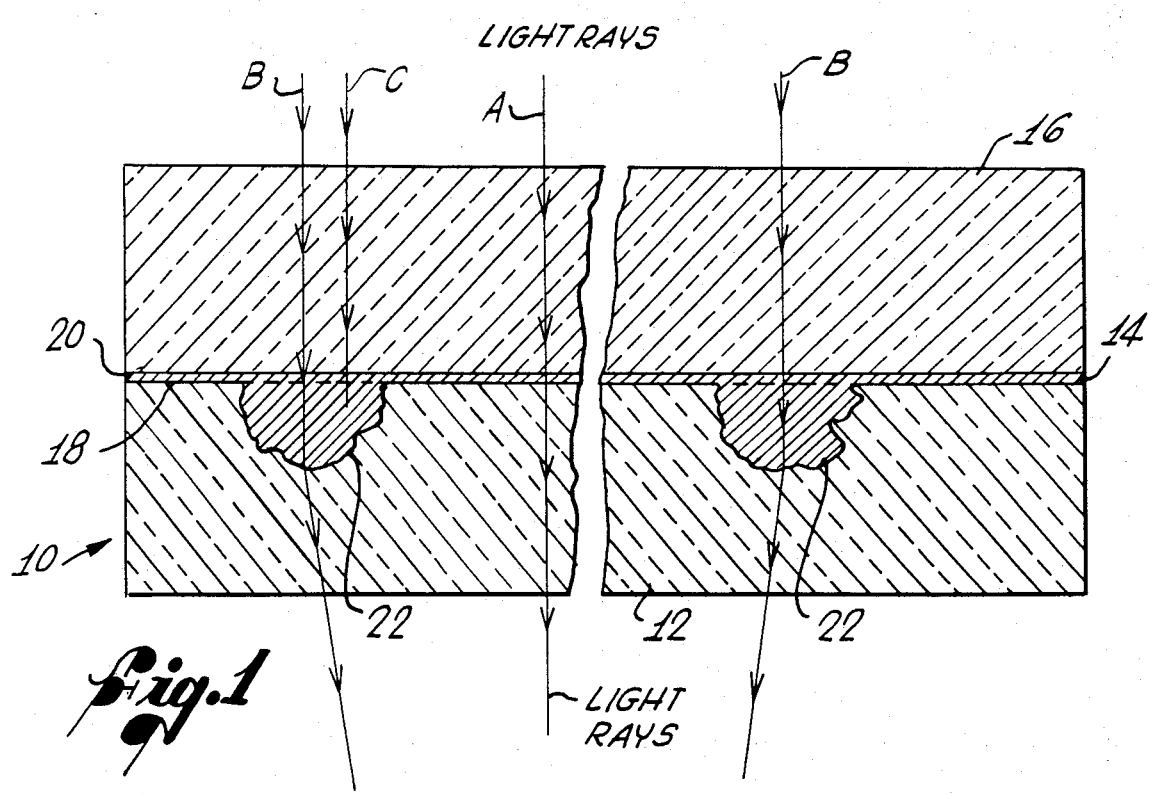
FIG. 1 is a cross-sectional view of a first diffusion filter constructed in accordance with the invention.

A filter 10, shown in FIG. 1, incorporates many advantages of the present invention. It includes a first transparent plate 12 bonded by cement 14 to a second transparent plate 16 in a sandwich configuration. Preferably, the plates 12 and 16 are glass, but they could also be plastic.

The plates 12 and 16 are parallel to each other having mutually opposed surfaces 18 and 20, the opposing surface 18 of the first plate 12 having a random array of pits 22 thereon. These pits 22 are each of an irregular configuration.

The cement 14, which covers the opposing surfaces 18 and 20 and fills the pits 22, is a neutral density, thermosetting material capable of absorbing a significantly greater portion of the light passing through it when compared to the glass plates 12 and 16. While thermosetting cement is preferred, other materials such as expoxy cements can be used.

The filter 10 is for use in combination with an image forming lens (not shown). It is placed in front of the lens, inside the front nodal point first node, with the lens axis perpendicular to the opposing surfaces 18 and 20. Most of the light reflected from the subject that strikes the filter 10 passes through the glass plates 12 and 16 without entering any of the pits 22 (as represented by the arrow A). The majority of this light is collected by the lens to form a sharply defined first image. Other light (B) enters the pits 22 and is refracted due to the difference in the refractive indices of the glass and cement. This light is diffused, and, when collected by the lens, forms a softly defined second image superimposed on the first. Still other light (C) that encounters the pits 22 becomes heterogeneous, probably as a result of scattering and internal reflections. It is absorbed by the neutral density cement 14 through which it is believed to follow a longer path when compared to the refracted light that forms the second image and it is, therefore, dissipated as heat. If this heterogeneous light were not absorbed, it would be diffused to too great an extent to enhance the second image. Instead, it would merely contribute to an undesired extension of the halo effect or else it would form a whitish veil over the entire image.

The preferred technique for making the filter 10 is to subject the glass plate 12 to sandblasting. The parameters to be maintained depend upon the hardness of the glass, the type of sand used, and the amount of diffusion desired. It has been found, however, that regardless of the number of pits 22 to be formed, the desired effect is produced when the pits are of a variety of depths, the deepest pits have a depth of about 0.01 inches made by sand of about 0.02 inches in diameter. These pits 22 may be deeper, if equipment permits, but a substantially lesser depth of the deepest pits 22 will have a deleterious effect on the image.

Sandblasting is desirable because it results in a random dispersion of the pits 22 over the surface 18 of the glass plate 12 and produces pits of the desired irregularity. Although other pit forming techniques, such as etching with acid, may also be successful, pits of a regular or smooth configuration should be avoided. It has been found, for example, that a glass plate in which conical pits have been machined is not acceptable.

Figure 2:
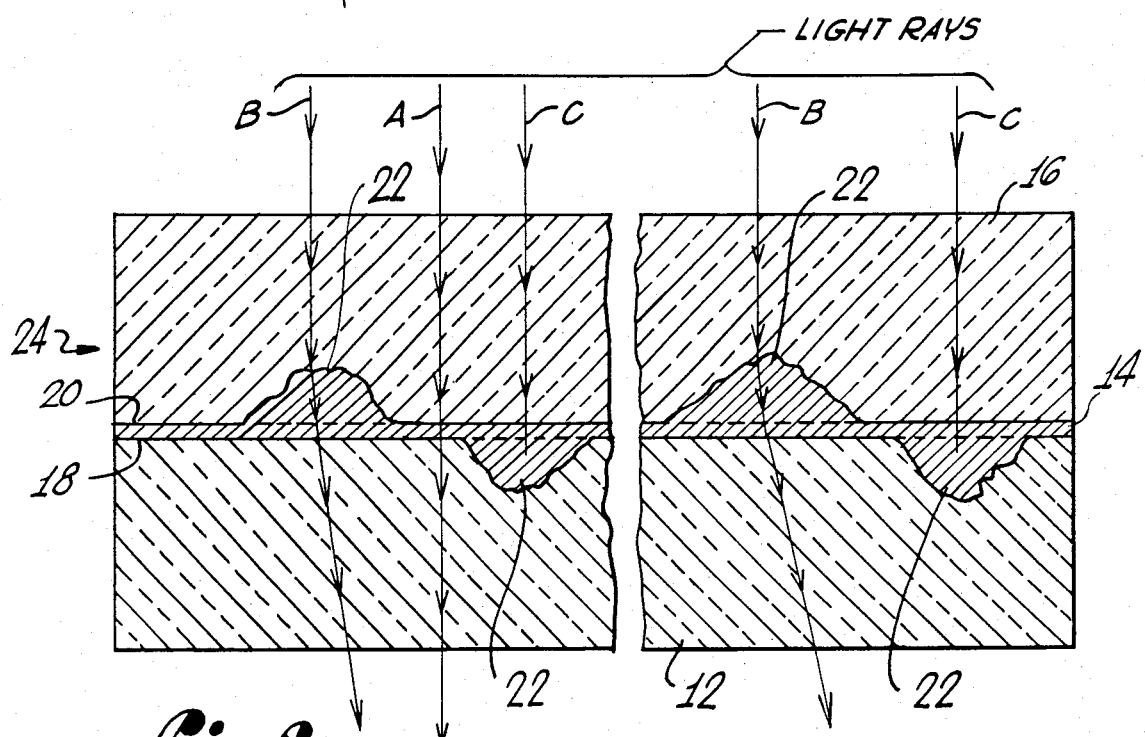
FIG. 2 is a similar cross-sectional view of another diffusion filter also constructed in accordance with the invention.

The longer the sandblasting continues, the more pits 22 will, of course, be formed per unit of area. It is preferable to produce sets of filters 10 having various degrees of diffusion so that an appropriate filter can be selected for a particular photographic purpose. However, it is undesirable to increase the density of pits 22 on the glass surface to such an extent that the pits 22 begin to overlap excessively. To avoid this effect, filters intended for high degree of diffusion should be constructed like the filter 24 shown in FIG. 2 of the drawings, similar elements being indicated by the same reference numerals.

Here the opposing surfaces 18 and 20 of both glass plates 12 and 16 are pitted and the pits 22 of both plates are filled by the cement 14. The two plates 12 and 16 are formed in the same manner by sandblasting. Whether one or two pitted plates are used, care should be taken to insure that the pits 22 are filled by the cement 14. In addition, the plates 12 and 16 should be firmly bonded together by a uniform coating of the cement 14 between them in the unpitted regions.

It will be noted that when a filter 10 or 24 produced in accordance with this invention is observed with the naked eye, a number of black dots, which are actually the larger pits, are readily apparent. This phenomenon does not occur in conventional diffusion filters but, despite the relatively large size of these pits, the final image will not be adversely affected. This is because the filter 10 or 24 is placed inside the front nodal point of the lens so that the lens cannot focus the pits as part of the image.

It will be noted that the filters 10 and 24 of the invention maintain the desirable qualities of a diffusion filter, providing a composite image (the sharp first image and the soft second image) that has a simulated three-dimensional effect. Nevertheless, the extent of the halo present in the composite image is greatly reduced and the whitish veil associated with conventional diffusion filters is virtually eliminated. The filters of the invention can be reliably mass produced at a reasonable cost using the method described above. They can be used with any type of image recording equipment, whether conventional photographic film or an electronic recording medium is employed.

While particular forms of the invention have been illustrated and described, it will be apparent that various modifications can be made without departing from the spirit and scope of the invention.

I claim:

1. A diffusion filter for use in combination with an image-forming lens by placement inside the front nodal point of said lens to produce a composite image having a simulated three-dimensional effect while minimizing halation and veiling, said filter comprising:

a light transmissive plate to be arranged so that a surface thereof is intersected by the axis of said image-forming lens, said plate having an array of spaced-apart pits on said surface separated by smooth flat surface areas, said pits being so dimensioned that the majority of the light falling on said plate passes through said surface areas without striking said pits; and a light transmissive material that is substantially more absorptive of light than said plate, having an index of refraction different than that of said plate and filling said pits, whereby light collected by said lens that has not entered any of said pits forms a first image that is sharply defined, some light collected by said lens that has entered said pits and has been refracted forms a second superimposed image that is softly defined, and some light that has entered said pits is absorbed by said material and is thus prevented from impinging upon said image as scattered or heterogenous light.

2. The filter of claim 1 wherein said material is of neutral density.

3. The filter of claim 1 wherein the deepest of said pits are at least about 0.01 inches deep.

4. The filter of claim 1 wherein said pits are of irregular configuration.

5. The filter of claim 4 wherein said pits are formed by sandblasting said plate.

6. The filter of claim 5 wherein said plate is glass.

7. The filter of claim 1 wherein said pits are of a variety of depths and are of irregular configuration the deepest of said pits being at least about 0.01 inches deep.

8. The filter of claim 1 wherein:

said pits are of a variety of depths and are of irregular configuration, the deepest of said pits being at least about 0.01 inches deep; and said material is of neutral density.

9. The filter of claim 1 wherein said pits are formed by sandblasting said plate.

10. A diffusion filter for use in combination with an image-forming lens by placement inside the front nodal point of said lens to produce a composite image having a simulated three-dimensional effect while minimizing halation and veiling, said filter comprising:

a pair of parallel light transmissive plates having mutually opposing surfaces to be positioned to be intersected by the axis of said lens, at least one of said surfaces having an array of spaced-apart pits thereon separated by smooth surface areas, said pits being so dimensioned that the majority of light falling on said plates passes therethrough without striking said pits; and a light transmissive cement joining said plates in a sandwich configuration, said cement adhering to at least a substantial portion of said opposing surfaces and filling said pits, said cement being substantially more absorptive of light than said plates and having an index of refraction different from that of said plates, whereby light collected by said lens that has struck said smooth surface areas and has not entered said pits forms a first image that is sharply defined, some light collected by said lens that has entered said pits and has been refracted forms a second superimposed image that is softly defined, and some light that has entered said pits is absorbed by said cement and is thus prevented from impinging upon said image as scattered or heterogenous light.

11. The filter of claim 10 wherein both of said opposing surfaces have arrays of pits thereon, all of said pits being filled by said cement.

12. The filter of claim 10 wherein said cement is of neutral density.

13. The filter of claim 12 wherein the deepest of said pits are at least about 0.01 inches deep.

14. The filter of claim 10 wherein said pits are of irregular configuration.

15. The filter of claim 10 wherein said plates are glass.

16. The filter of claim 10 wherein said pits are of a variety of depths and are of irregular configuration, the deepest of said pits being at least about 0.01 inches deep.

17. The filter of claim 10 wherein:
said pits are of a variety of depths and are of irregular configuration, the deepest of said pits being at least 0.01 inches deep; and
said cement is of neutral density.

18. A diffusion filter for use in combination with an image-forming lens by placement inside the front nodal point of said lens to produce a softly defined image having a simulated three-dimensional effect while minimizing halation and veiling, said filter comprising:

a pair of parallel transparent glass plates having mutually opposing surfaces intersected perpendicularly by the axis of said lens, said opposing surfaces each having a random array of spaced-apart irregularly shaped pits formed thereon by sandblasting separated by smooth flat surface areas, the deepest of said pits being about 0.01 inches deep, said pits being so dimensioned that the majority of light falling on said plate passes through said smooth flat surface areas without striking said pits; and a light transmissive, thermosetting, neutral density cement adhering to said opposing surfaces and filling said pits, said cement being substantially more absorptive of light than said plates and having an index of refraction different from that of said plates, whereby light collected by said lens that has not entered said pits forms a first image that is sharply defined, some light collected by said lens that has entered said pits and is refracted forms a second superimposed image that is softly defined, and some light that enters said pits is absorbed by said cement and is thus prevented from impinging upon said image as scattered or heterogeneous light.

19. A method of making a diffusion filter that can be used in combination with an image-forming lens by placement inside the front nodal point of said lens to produce a composite image having a simulated three-dimensional effect while minimizing halation and veiling, said method comprising the steps of:

sandblasting a transparent plate to form a randon array of spaced-apart irregularly shaped pits on a surface thereof separated by smooth surface areas, said pits being so dimensioned that the majority of the light falling on said plate passes through said surface areas without striking said pits; and applying a cement to said surface and causing said cement to fill said pits, said cement being substantially more absorptive of light than said plate and having an index of refraction different from that of said plate.

20. The method of claim 19 comprising the further step of positioning a second plate adjacent said first plate so that said cement bonds said second plate to said first plate.

21. The method of claim 20 wherein the deepest of said pits have a depth of at least about 0.01 inches.

22. The method of claim 19 comprising the further steps of:

sandblasting a second plate having an index of refraction different from said cement to form a random array of pits on a surface thereof; and positioning the sandblasted surface of said second plate in opposition to the sandblasted surface of said first plate so that said cement fills the pits of said second plate and bonds said second plate to said first plate.

* * * * *

UNITED STATES PATENT AND TRADEMARK OFFICE
CERTIFICATE OF CORRECTION

PATENT NO. : 4,329,023

DATED : May 11, 1982

INVENTOR(S) : William H. Harrison

It is certified that error appears in the above-identified patent and that said Letters Patent are hereby corrected as shown below:

Column 1, line 20, delete "shape" and insert therefor --sharp--;
Column 1, line 21, insert --effect-- after "stereoscopic";
Column 6, claim 19, line 24, delete "randon" and insert therefor -- random --.

Signed and Sealed this

Twenty-first Day of September 1982

[SEAL]

Attest:

GERALD J. MOSSINGHOFF

Attesting Officer

Commissioner of Patents and Trademarks